United States Patent
Hong

(10) Patent No.: US 8,155,590 B2
(45) Date of Patent: Apr. 10, 2012

(54) APPARATUS AND METHOD FOR BLUETOOTH CONNECTION IN A PORTABLE COMMUNICATION SYSTEM

(75) Inventor: Il-Pyo Hong, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 973 days.

(21) Appl. No.: 12/029,808

(22) Filed: Feb. 12, 2008

(65) Prior Publication Data

US 2008/0194203 A1 Aug. 14, 2008

(30) Foreign Application Priority Data

Feb. 12, 2007 (KR) ........................ 10-2007-0014260

(51) Int. Cl.
*H04B 7/00* (2006.01)

(52) U.S. Cl. ................. 455/41.2; 455/552.1; 455/556.1; 455/557; 455/435.1; 455/435.2; 455/574; 370/338; 370/908; 709/229

(58) Field of Classification Search ................. 455/41.2, 455/411, 434, 466, 550.1, 556.1, 556.2, 557, 455/435.2, 552.1, 435.1, 574; 370/338, 908; 709/229; 713/168
See application file for complete search history.

(56) References Cited

U.S. PATENT DOCUMENTS

| | | | |
|---|---|---|---|
| 6,633,757 B1 * | 10/2003 | Hermann et al. | 455/414.1 |
| 6,665,549 B1 * | 12/2003 | Reed | 455/573 |
| 6,678,516 B2 * | 1/2004 | Nordman et al. | 455/414.1 |
| 6,850,503 B2 * | 2/2005 | Dorenbosch et al. | 370/331 |
| 6,970,726 B2 * | 11/2005 | Takayanagi | 455/574 |
| 6,973,306 B2 * | 12/2005 | Kim | 455/426.1 |
| 7,102,640 B1 * | 9/2006 | Aholainen et al. | 345/440 |
| 7,103,313 B2 * | 9/2006 | Heinonen et al. | 455/41.2 |
| 7,274,934 B2 * | 9/2007 | Arazi et al. | 455/436 |
| 7,330,445 B2 * | 2/2008 | Park | 370/314 |
| 7,336,929 B2 * | 2/2008 | Yasuda et al. | 455/41.2 |
| 7,369,532 B2 * | 5/2008 | Silvester | 370/349 |
| 7,426,405 B2 * | 9/2008 | Lee | 455/575.1 |
| 7,444,117 B2 * | 10/2008 | Katayama et al. | 455/11.1 |
| 7,475,244 B2 * | 1/2009 | Sugikawa | 713/168 |
| 7,567,820 B2 * | 7/2009 | Bitran et al. | 455/552.1 |
| 7,589,726 B2 * | 9/2009 | Aholainen et al. | 345/440 |
| 7,675,537 B2 * | 3/2010 | Wilson et al. | 348/14.01 |
| 7,756,477 B2 * | 7/2010 | Lee | 455/41.2 |
| 7,974,577 B2 * | 7/2011 | Stephens, Jr. | 455/41.2 |
| 2005/0136949 A1 * | 6/2005 | Barnes, Jr. | 455/461 |
| 2007/0173266 A1 * | 7/2007 | Barnes, Jr. | 455/456.1 |

* cited by examiner

*Primary Examiner* — Marceau Milord

(74) *Attorney, Agent, or Firm* — Jefferson IP Law, LLP

(57) ABSTRACT

A mobile communication system and method for supporting an automatic Bluetooth connection are provided. The system includes a portable terminal and a Bluetooth device. When a coupling with a connection terminal of the Bluetooth device is detected, the portable terminal enables a Bluetooth function of the portable terminal, performs a pairing process and performs a communication connection with the Bluetooth device. After coupling with a connection terminal of the portable terminal, the Bluetooth device performs a process of pairing with the portable terminal and performs a communication connection with the portable terminal.

19 Claims, 4 Drawing Sheets

APPARATUS AND METHOD FOR BLUETOOTH CONNECTION IN A PORTABLE COMMUNICATION SYSTEM

PRIORITY

This application claims the benefit under 35 U.S.C. §119 (a) of a Korean patent application filed in the Korean Intellectual Property Office on Feb. 12, 2007 and assigned Serial No. 2007-14260, the entire disclosure of which is hereby incorporated by reference.

BACKGROUND OF THE INVENTION

1. Field of the Invention

The present invention relates to a portable terminal supporting a Bluetooth function. More particularly, the present invention relates to a portable terminal apparatus and method for simplifying a process of registering and pairing with a Bluetooth device.

2. Description of the Related Art

In recent years, the use of portable terminals has sharply increased due to their convenience including their portability and supplementary functions. With the increased use of portable terminals, service providers (e.g., terminal manufacturers) are developing more supplementary functions for portable terminals so as to provide even more convenience for users.

Bluetooth, one of the supplementary functions provided for portable terminals, is a technology that allows for communication between terminals that are positioned a short distance from each other. Using Bluetooth, portable terminals are able to provide a diversity of user services such as listening to music through a headset, controlling the printing of a document, controlling the transmission of a file and the like.

Bluetooth is a technology standard, defined by a nonprofit organization named "BLUETOOTH SIG," that provides an inexpensive data and voice local area wireless connection using a frequency band of 2.4 GHz. Bluetooth is based on the Institute of International Electrical and Electronics Engineers (IEEE) 802.11 standard, which is hereby incorporated by reference. An advantage of Bluetooth is that it is applicable even to places where information processing and communication equipment is dense. Bluetooth achieves this advantage by allowing several independent piconets to overlap with each other in the same space. In addition, Bluetooth has transmission error correction, identification, and password and power saving functions.

FIG. 1 is a diagram illustrating a conventional process of connecting with neighboring Bluetooth devices by a portable terminal 100 having a Bluetooth module.

As shown in FIG. 1, the process includes searching for neighboring Bluetooth devices that are connectable with the portable terminal 100 using a Bluetooth connection. As a result of the search, the portable terminal 100 locates Bluetooth devices 122, 124, and 126 which may be used to provide respective services for the portable terminal 100. After the various devices are located, the process includes creating a list of the located Bluetooth devices 122, 124, and 126.

Though not illustrated, the list of located Bluetooth devices 122, 124 and 126 may be displayed on a screen of the portable terminal for user convenience. From the displayed list, the user of the portable terminal may select a target Bluetooth device from the created list and then establish a communication connection through an input of preset authentication information. An example of performing these steps is illustrated on screen 102 of FIG. 1 wherein the user of the portable terminal selects the first listed device as the target Bluetooth device from the list of found equipments and establishes a communication connection by inputting a password.

As described above, the user of the portable terminal selects the target Bluetooth device from among the list of the neighboring Bluetooth devices 122, 124, and 126. After selection by the user, the portable terminal provides the user with a service associated with the selected Bluetooth device by performing a communication connection with the Bluetooth device.

However, there is a drawback in that, when searching for connectable neighboring Bluetooth devices, the portable terminal must go through a procedure of Bluetooth setting, finding, equipment registration, password identification, and equipment connection on a User Interface (UI) by pressing a control button for a predetermined time to enter a hardware scan mode.

Also, there is a drawback in that, when the portable terminal performs a Bluetooth scan operation automatically, it takes a long time to search the neighboring Bluetooth devices and the Bluetooth devices are redundantly searched, causing a connection with undesired equipment.

Thus, there is a demand for an apparatus and method for simplifying a process of establishing a communication connection with a Bluetooth device in a portable terminal.

SUMMARY OF THE INVENTION

An aspect of the present invention is to address at least the above problems and/or disadvantages and to provide at least the advantages described below. Accordingly, an aspect of the present invention is to provide an apparatus and method for simplifying a process of registering and pairing with a neighboring Bluetooth device in a portable terminal.

Another aspect of the present invention is to provide an apparatus and method for performing a Bluetooth function at the time a connection is made between a portable terminal and a Bluetooth device through a connection terminal.

A further aspect of the present invention is to provide an apparatus and method for performing an auxiliary charge using battery power of a portable terminal in a Bluetooth device.

The above aspects are achieved by providing an apparatus and method for Bluetooth connection in a portable communication system.

According to one aspect of the present invention, a mobile communication system supporting an automatic Bluetooth connection is provided. The system includes a portable terminal and a Bluetooth device. When identifying a connection with a connection terminal of the Bluetooth device, the portable terminal enables a Bluetooth function of the portable terminal, performs a pairing process, and performs a communication connection with the Bluetooth device. After connecting with a connection terminal of the portable terminal, the Bluetooth device performs a process of pairing with the portable terminal and performs a communication connection with the portable terminal.

According to another aspect of the present invention, a method configured to support automatic Bluetooth connection in a mobile communication system is provided. The method includes, when identifying a connection with a connection terminal of a Bluetooth device in a portable terminal, enabling a Bluetooth function of the portable terminal, performing a pairing process, and performing a communication connection with the Bluetooth device, and after connecting with a connection terminal of the portable terminal in the Bluetooth device, performing a process of pairing with the portable terminal and performing a communication connection with the portable terminal.

BRIEF DESCRIPTION OF THE DRAWINGS

The above and other aspects, features and advantages of certain exemplary embodiments of the present invention will become more apparent from the following detailed description when taken in conjunction with the accompanying drawings in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Terms described below, which are defined considering functions in the present invention, can be different depending on user and operator's intention or practice. Therefore, the terms should be defined on the basis of the disclosure throughout this specification.

An exemplary apparatus and method for simplifying a process of registering and pairing with a Bluetooth device in a portable terminal are described below. In the following description, the term "portable terminal" includes a cellular phone, a Personal Communication System (PCS) phone, a Personal Digital Assistant (PDA), an International Mobile Telecommunication-2000 (IMT-2000) phone, a 4th-generation broadband system, and any portable device supporting a Bluetooth communication.

Figure 1:
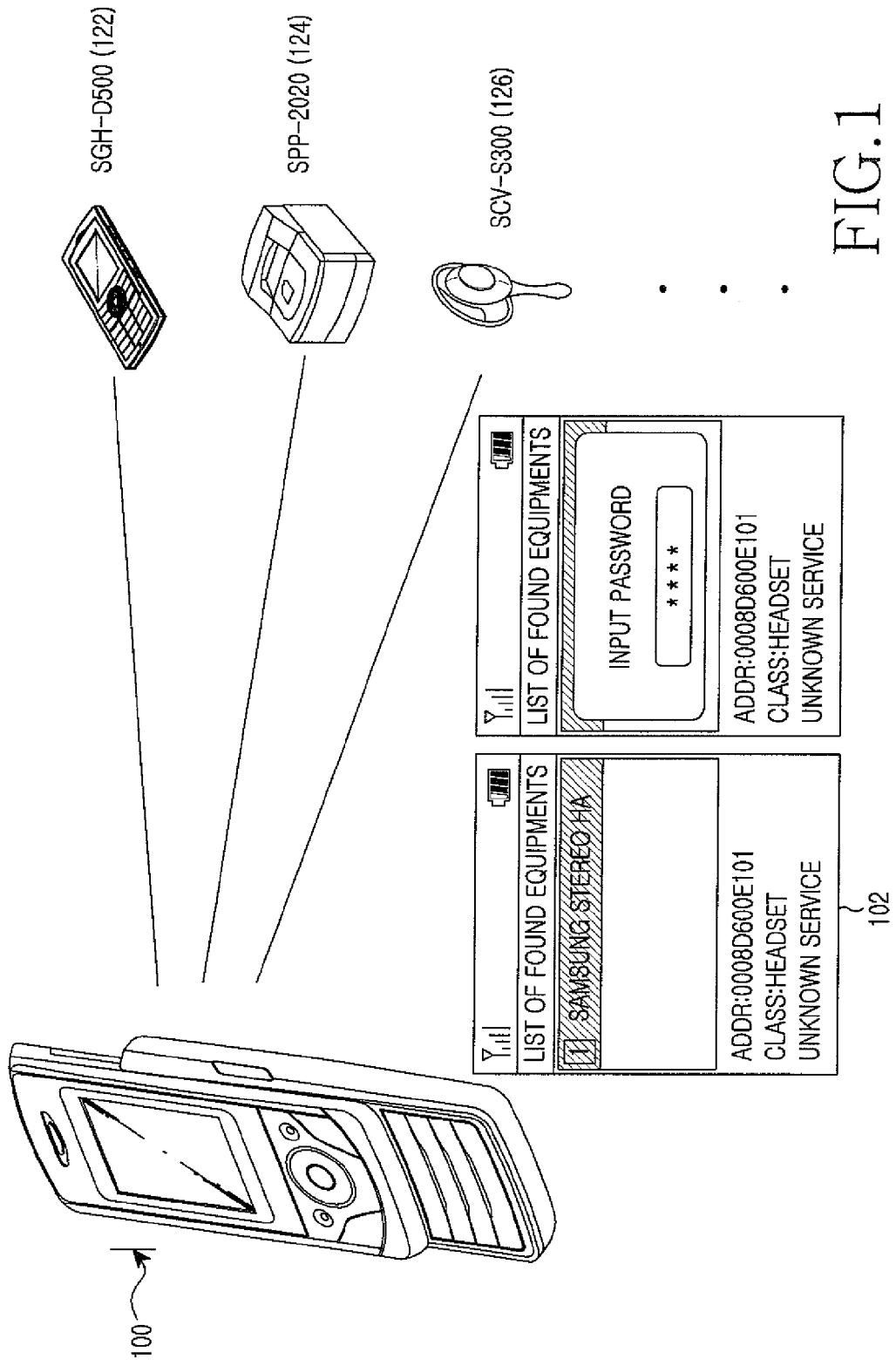
FIG. 1 is a diagram illustrating a conventional process of connecting with neighboring Bluetooth devices in a portable terminal having a Bluetooth module.
Figure 2:
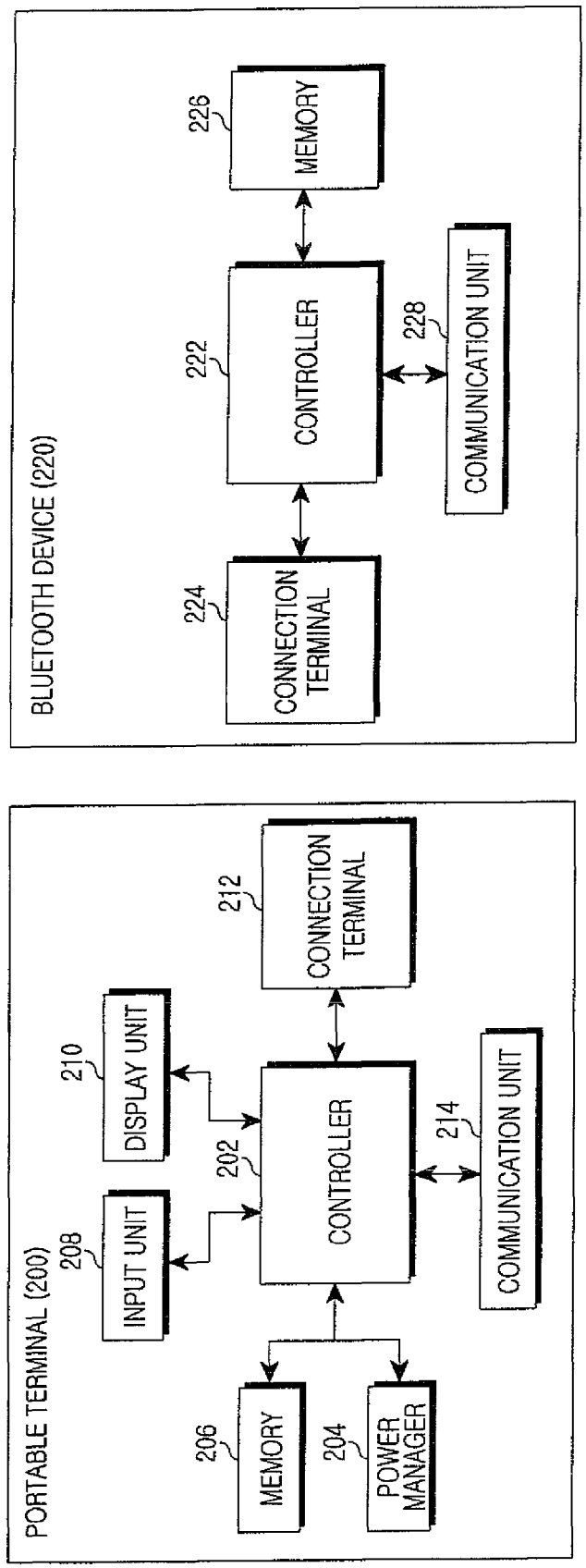
FIG. 2 is a block diagram illustrating construction of a portable terminal and a Bluetooth device for performing automatic connection according to an exemplary embodiment of the present invention.

FIG. 2 is a block diagram illustrating the construction of a portable terminal 200 and a Bluetooth device 220 for performing automatic connection according to an exemplary embodiment of the present invention.

Referring to FIG. 2, the portable terminal 200 may include a controller 202, a power manager 204, a memory 206, an input unit 208, a display unit 210, a connection terminal 212 and a communication unit 214.

The controller 202 controls the general operation of the portable terminal 200. For example, the controller 202 performs a process and control for voice telephony and data communication. In addition to the general operation, the controller 202 initiates a Bluetooth function upon detecting an interrupt that is caused by a connection between the connection terminal 212 of the portable terminal 200 and a connection terminal 224 of the Bluetooth device 220 according to an exemplary embodiment of the present invention.

In detail, the controller 202 recognizes an interrupt, which is generated upon establishing a coupling between the connection terminal 212 and the connection terminal 224, as a command for attempting a Bluetooth connection. Upon detecting the interrupt, the controller 202 initiates an operation (e.g., pairing) necessary for the Bluetooth connection.

If a charge request is received from the Bluetooth device 220, the controller 202 controls the power manager 204 to forward a desired amount of power to the Bluetooth device 220.

Under the control of the controller 202, the power manager 204 provides power to the Bluetooth device 220 which may be used to charge a battery of the Bluetooth device 220.

The memory 206 may include a Read Only Memory (ROM), a Random Access Memory (RAM), and a flash ROM. The ROM stores a microcode of a program for processing and controlling the controller 202 and a variety of reference data.

The RAM stores data generated during execution of any of the variety of programs performed by the controller 202. The flash ROM stores various updateable data for safekeeping such as a phone book, outgoing messages, incoming messages and the like.

The input unit 208 includes numeral key buttons '0' to '9', a menu button, a cancel button (delete), an OK button, a talk button, an end button, an Internet button, navigation key (or direction key) buttons, a plurality of function keys such as a character input key and the like. The input unit 208 provides key data, corresponding to a key pressed by a user, to the controller 202.

The display unit 210 displays status information generated during execution of programs by the portable terminal 200, characters used as input, as well as moving and still pictures. The display unit 210 can be a color Liquid Crystal Display (LCD). In an exemplary implementation, the display unit 210 is a touchscreen that may be used to provide input to the controller 202.

The connection terminal 212 refers to a connector for connection with the Bluetooth device 220. The connection terminal 212 may include means for a physical connection to the Bluetooth device 220 or for a wireless connection using Radio Frequency (RF) electrical inductive or capacitive coupling and the like. The communication unit 214 exchanges a radio signal including data input/output through an antenna (not shown). For example, in a transmission mode, the communication unit 214 processes data by channel coding and spreading, converts the processed data into a Radio Frequency (RF) signal and transmits the RF signal. In a reception mode, the communication unit 214 converts a received RF signal into a baseband signal, processes the baseband signal by de-spreading and channel decoding and restores the processed signal to data. The communication unit 214 may include a Bluetooth module (not shown) for, under the control of the controller 202, searching neighboring Bluetooth devices 220 that are connectable to the portable terminal 200, pairing with the searched neighboring Bluetooth devices 220 and performing a Bluetooth communication connection.

The Bluetooth device 220 may include a controller 222, a connection terminal 224, a memory 226, and a communication unit 228.

The controller 222 controls the general operation of the Bluetooth device 220. For example, the controller 222 controls a communication connection with the portable terminal 200 and controls charging of a battery of the Bluetooth device 220 using power provided from the portable terminal 200.

The connection terminal 224 refers to a connector for coupling with the portable terminal 200. The connection terminal 224 may include means for a physical connection to the portable terminal 200 or for a wireless connection using RF electrical inductive or capacitive coupling and the like. The memory 226 stores a microcode of a program for processing and controlling the controller 222 and a variety of reference data. The communication unit 228 exchanges data for communication connection with the portable terminal 200.

An apparatus for shortening a connection time by automatic connection when implementing a communication connection with a Bluetooth device in a portable terminal supporting a Bluetooth function has been described above. A method for implementing the automatic connection with the Bluetooth device in a portable terminal according to an exemplary embodiment of the present invention is described below.

Figure 3:
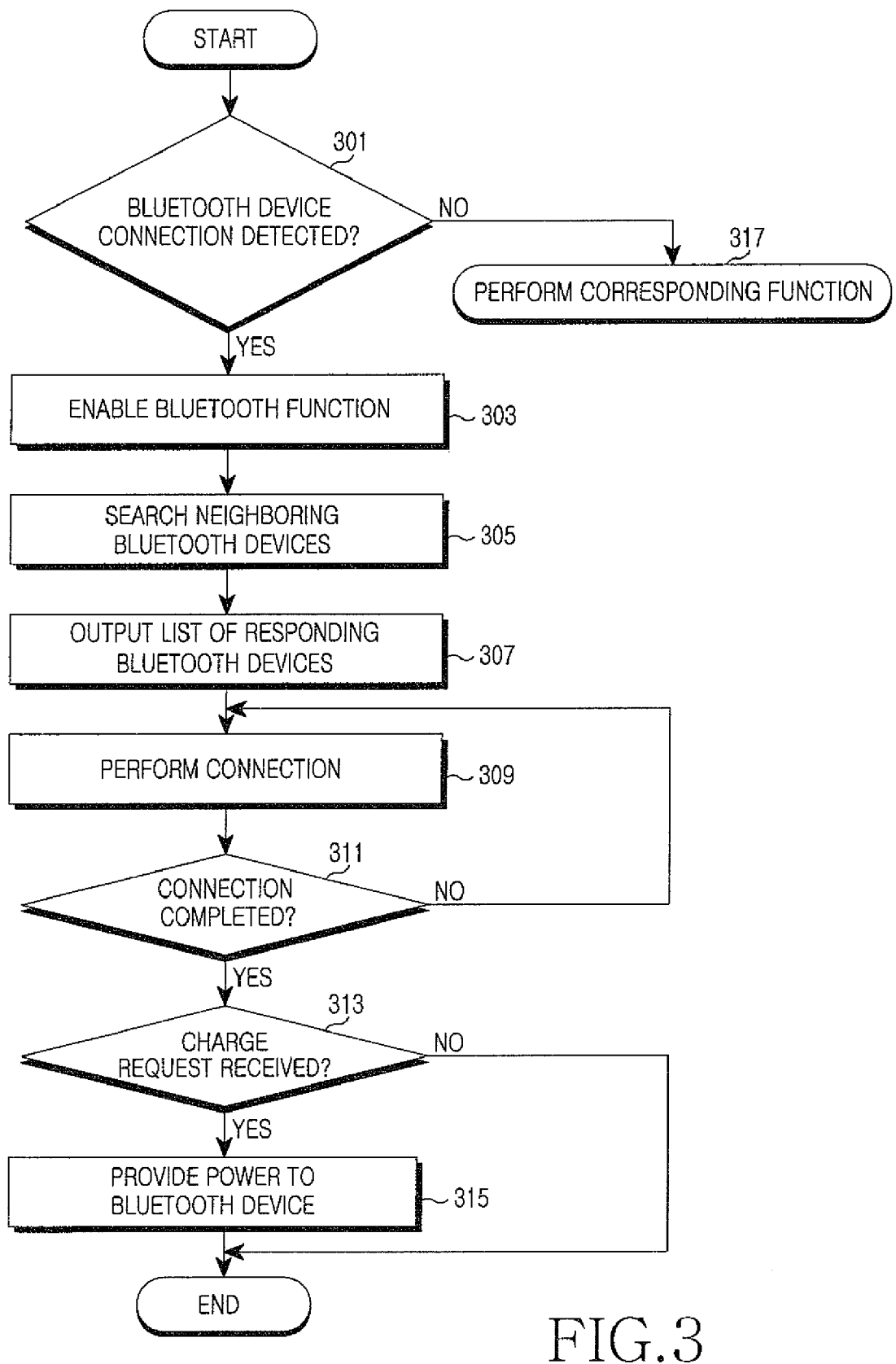
FIG. 3 is a flow diagram illustrating a process of automatically connecting with a Bluetooth device in a portable terminal according to an exemplary embodiment of the present invention.

FIG. 3 is a flow diagram illustrating a process of automatically connecting with a Bluetooth device in a portable terminal according to an exemplary embodiment of the present invention.

Referring to FIG. 3, the controller 202 determines whether an equipment connection, made by a coupling between the connection terminal 212 of the portable terminal 200 and the connection terminal 224 of the Bluetooth device 220, is detected in step 301. If an equipment connection is not detected, the controller 202 performs a corresponding function (e.g., an idle mode) in step 317.

If an equipment connection is detected in step 301, the controller 202 enables a Bluetooth function in step 303. That is, the controller 202 determines whether to enable the Bluetooth function depending on whether an interrupt caused by a coupling of the connection terminal 212 is detected. The controller 202 then searches for neighboring Bluetooth devices 220 in step 305.

Upon receiving search results in the form of responses from the neighboring Bluetooth devices 220 in step 305, the controller 202 processes and outputs a list of the responding Bluetooth devices 220 to the display unit 210 in step 307. The controller 202 then performs a communication connection with the target Bluetooth device 220 in step 309.

The target Bluetooth device 220 refers to the Bluetooth device that is coupled via the connection terminal 212 of the portable terminal 200. The communication connection with the target Bluetooth device 220 may be implemented by inputting preset authentication information to a Bluetooth connection screen displayed on the display unit 210 of portable terminal 200.

Next, the controller 202 determines whether a completion of the communication connection with the Bluetooth device 220 is detected. If completion of the communication connection is not detected, the controller 202 returns to step 309. If completion of the communication connection is detected, the controller 202 may change a Bluetooth connection screen, which is under display on the display unit 210, into an idle screen for general control of the portable device 200.

After completion of the communication connection is detected, the controller 202 determines whether a charge request is received from the Bluetooth device 220 in step 313.

The charge request is a request, made by the Bluetooth device 220 to the portable terminal 200, for the portable terminal 200 to provide power to the Bluetooth device 220. In an exemplary implementation, the power supplied to the Bluetooth device 220 from the portable terminal 200 is used for charging a battery of the Bluetooth device 220.

If the charge request is not received from the Bluetooth device 220 in step 313, the controller 202 terminates the process.

Alternatively, if the charge request is received, the controller 202 controls the power manager 204 to provide power to the Bluetooth device 220 in step 315. The power supplied to the Bluetooth device 220 from the portable terminal 200 may be regulated by the power manager 204 in terms of a voltage limitation, a current limitation, a time limitation and the like.

After that, the controller 202 terminates the process.

Figure 4:
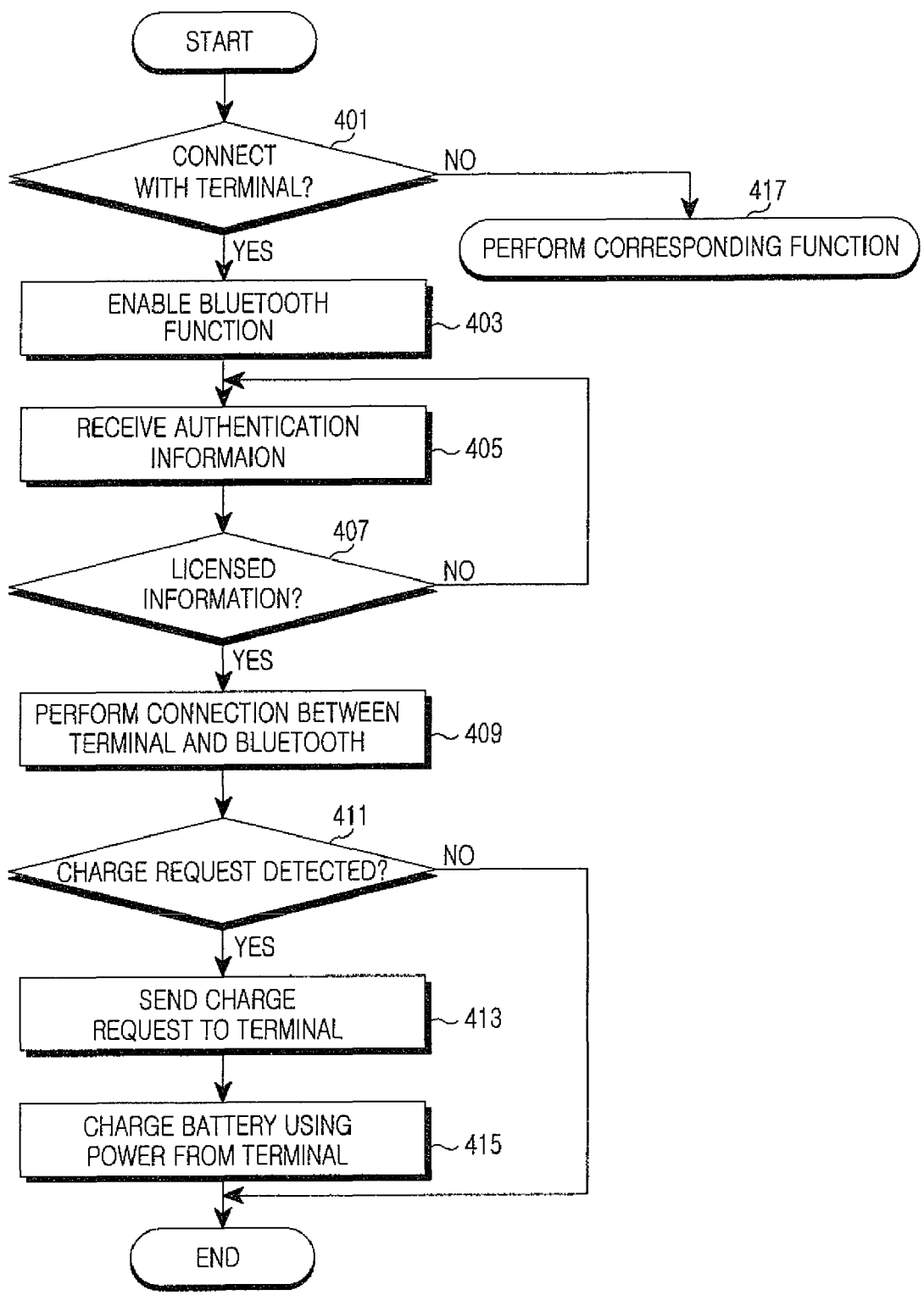
FIG. 4 is a flow diagram illustrating a process of automatically connecting with a portable terminal in a Bluetooth device according to an exemplary embodiment of the present invention.

FIG. 4 is a flow diagram illustrating a process of automatically connecting with a portable terminal in a Bluetooth device according to an exemplary embodiment of the present invention.

Referring to FIG. 4, the controller 222 of Bluetooth device 220 determines whether an equipment connection, made by a coupling between the connection terminal 224 of the Bluetooth device 220 and the connection terminal 212 of the portable terminal 200, is detected in step 401. If an equipment coupling is not detected, the controller 222 performs a corresponding function (e.g., an idle mode) in step 417.

If an equipment coupling is detected, the controller 222 enables a Bluetooth function in step 403 and then receives authentication information from the portable terminal 200 in step 405.

In step 407, the controller 222 determines if the received authentication information is licensed information. In an exemplary implementation, the controller 222 searches the memory 226 of the Bluetooth device 220 for licensed authentication information and compares the received authentication information with the licensed authentication information.

If the received authentication information is not the licensed authentication information, the controller 222 returns to step 405.

If the received authentication information matches the licensed authentication information, the controller 222 performs a Bluetooth connection with the portable terminal 200 in step 409.

Next, the controller 222 determines whether a charge request, made by a user, is detected in step 411. The charge request is a request to provide power to the Bluetooth device 220. In an exemplary embodiment, the power provided to the Bluetooth device may be used for charging a battery of the Bluetooth device 220. In an exemplary implementation, the user may input the charge request by pressing a button included in the Bluetooth device 220.

If a charge request is not detected, the controller 222 terminates the process.

If the charge request is detected, the controller 222 sends a charge request to the portable terminal 200 in step 413 and then processes the power received from the portable terminal 200 in step 415. In an exemplary implementation as illustrated in FIG. 4, power received from the portable terminal 200 is processed to charge the battery of the Bluetooth device 220.

After that, the controller 222 terminates the process.

As described above, exemplary embodiments of the present invention can simplify a process of pairing with the Bluetooth device by the apparatus and method for Bluetooth connection in a portable terminal.

Also, exemplary embodiments of the present invention provide a convenience that the charge of the Bluetooth device using the power of the portable terminal can be implemented by a connection between the connection terminals installed in the portable terminal and the Bluetooth device.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A mobile communication system supporting an automatic Bluetooth connection, the system comprising:
   a portable terminal; and
   a Bluetooth device,
   wherein the portable terminal enables a Bluetooth function of the portable terminal when a Bluetooth device is connected, performs a pairing process with the Bluetooth device and further wherein the Bluetooth device performs a pairing process with the portable terminal and performs a communication connection with the portable terminal after coupling with a connection terminal of the portable terminal, and
   wherein the portable terminal further comprises:
      a communication unit for communicating with the Bluetooth device; and
      a controller for processing and performing a Bluetooth function and for processing and performing an operation necessary for performing the communication connection with the Bluetooth device using the communication unit when an interrupt caused by a coupling between the connection terminal of the portable terminal and the connection terminal of the Bluetooth device is detected.

2. The system of claim 1, wherein the portable terminal further comprises a power manager configured to provide power from the portable terminal to the Bluetooth device.

3. The system of claim 2, wherein, when receiving a request for power from the Bluetooth device, the controller controls the power manager to provide power of the portable terminal to the Bluetooth device.

4. The system of claim 3, wherein the power manager provides at least one of a regulated voltage and a regulated current to the Bluetooth device.

5. The system of claim 1, wherein the Bluetooth device further comprises:
   a communication unit for communicating with the portable terminal; and
   a controller for controlling an operation necessary for performing the communication connection with the portable terminal using the communication unit when an interrupt caused by a coupling between the connection terminal of the Bluetooth device and the connection terminal of the portable terminal is detected.

6. The system of claim 5, wherein the controller of the Bluetooth device sends a request for power to the portable terminal when a request for providing power to the Bluetooth device from the portable terminal is input by a user.

7. The system of claim 6, wherein the controller of the Bluetooth device controls the charging of a battery of the Bluetooth device using power received from the portable terminal in response to the request for power.

8. The system of claim 1 wherein the portable terminal searches for neighboring Bluetooth devices before performing the pairing process.

9. A method of providing an automatic Bluetooth connection in a mobile communication system, the method comprising:
   connecting, by a Bluetooth device, to a portable terminal;
   detecting, by the portable terminal, a connecting to the Bluetooth device;
   enabling a Bluetooth function of the portable terminal if the connecting is detected;
   performing a pairing process between the portable terminal and the Bluetooth device;
   performing a communication connection between the portable terminal and the Bluetooth device by first coupling the Bluetooth device with a connection terminal of the portable terminal;
   receiving, by the portable terminal, a request for power from the Bluetooth device after the performing of the communication connection between the portable terminal and the Bluetooth device; and
   providing power from the portable terminal to the Bluetooth device.

10. The method of claim 9, further comprising charging a battery in the Bluetooth device using the power provided from the portable terminal.

11. The method of claim 10, further comprising managing, by the portable terminal, the providing of the power from the portable terminal using at least one of voltage regulation and current regulation.

12. The method of claim 9, further comprising:
   after performing the communication connection between the portable terminal and the Bluetooth device, detecting a user request for auxiliary power at the Bluetooth device;
   sending, by the Bluetooth device, a request for power to the portable terminal; and
   providing, by the portable terminal, power to the Bluetooth device.

13. The method of claim 12, further comprising charging a battery of the Bluetooth device using the power provided by the portable terminal.

14. A portable terminal for providing a Bluetooth connection comprising:
   a controller;
   a power manager for providing power from the portable terminal to the Bluetooth device using the connection terminal; and
   a connection terminal,
   wherein the controller enables a Bluetooth function if a coupling to a Bluetooth device at the connection terminal is detected and performs a pairing process with the Bluetooth device.

15. The portable terminal of claim 14, further comprising a communication unit wherein the controller performs the pairing process using the communication unit.

16. The portable terminal of claim 15, wherein the power manager provides the power by using at least one of a regulated voltage and a regulated current.

17. The portable terminal of claim 16, wherein the controller controls a search for neighboring Bluetooth devices prior to performing the pairing process.

18. A Bluetooth device for providing a Bluetooth connection with a portable terminal, comprising:

a communication unit for communicating with the portable terminal;

a controller; and a connection terminal, wherein the controller enables a Bluetooth function if a coupling to a portable terminal at the connection terminal is detected and performs a pairing process with the portable device, and controls an operation necessary for performing the communication connection with the portable terminal using the communication unit when an interrupt caused by a coupling between the connection terminal of the Bluetooth device and the connection terminal of the portable terminal is detected.

19. A computer-readable recording medium having recorded thereon a program for providing an automatic Bluetooth connection in a mobile communication system, comprising:

a first segment, for coupling, by a Bluetooth device, to a connection terminal of a portable terminal;

a second segment, for detecting, by the portable terminal, a coupling to a connection terminal of the Bluetooth device;

a third segment, for enabling a Bluetooth function of the portable terminal if the coupling is detected;

a fourth segment, for performing a pairing process between the portable terminal and the Bluetooth device;

a fifth segment, for performing a communication connection between the portable terminal and the Bluetooth device;

a sixth segment, for receiving, by the portable terminal, a request for power from the Bluetooth device after the performing of the communication connection between the portable terminal and the Bluetooth device; and a seventh segment, for providing power from the portable terminal to the Bluetooth device.

* * * * *